Sept. 8, 1931.                E. V. JOHNSON                1,822,035
                           HOLDER FOR EGG BEATERS
                            Filed June 11, 1928

Inventor
E. V. Johnson
By M. Talbert Dick
Attorney

Patented Sept. 8, 1931

1,822,035

UNITED STATES PATENT OFFICE

EDWARD V. JOHNSON, OF GOWRIE, IOWA

HOLDER FOR EGG BEATERS

Application filed June 11, 1928. Serial No. 284,352.

The principal object of this invention is to provide a device for holding an egg beater or the like rigidly while in use.

A further object of this invention is to provide an egg beater holder that permits the egg beater to be quickly attached or detached from the device.

A still further object of this invention is to provide a device for supporting and holding an egg beater that is adjustable to accommodate various sizes and types of egg beaters.

A still further object of this invention is to provide a device for supporting and holding an egg beater that is readily adjustable to accommodate dishes or receptacles of various depths and thicknesses.

A still further object of this invention is to provide a device for supporting and holding an egg beater or like that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Beaters for whipping cream, beating eggs, and the like are one of the most important cutlery instruments around the kitchen, however they are very tiresome to use as the beater must be held rigidly in one hand and operated by the other hand. I have overcome this objection by providing a holding device as will hereinafter be appreciated.

Figure 1:
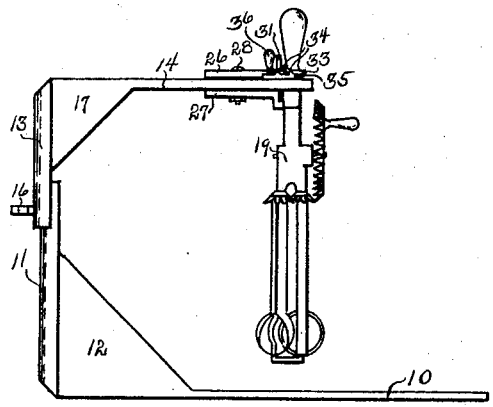
Fig. 1 is a side view of my complete invention supporting and holding the ordinary egg beater.
Figure 2:
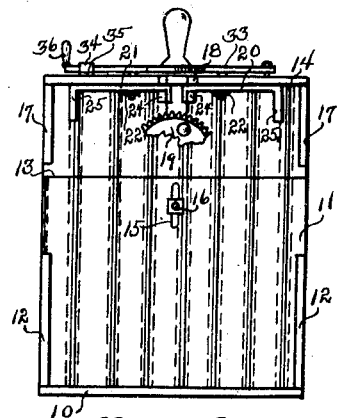
Fig. 2 is a front view of the egg beater holder with a portion of the egg beater cut away.

I have used the numeral 10 to designate the base portion by my device having the vertical corrugated wall 11 extending from its back marginal edge. The numeral 12 designates webbing extending between the side edges of the base and wall as shown in Fig. 1 and Fig. 2, for strengthening the device. If the base, wall and webbing is of sheet metal, the same may be stamped from a single sheet of material. Designed to engage the upper portion of the wall 11 is a second vertical corrugated wall 13 having the forwardly extending plate member 14 integrally formed on its upper marginal edge. Passing through a longitudinal slot 15 in each of the walls is a hand operated bolt 16. By this arrangement the wall 13 is slidably secured to the wall 11 and by loosening the bolt 16 the plate member 14 may be moved closer to or further from the base 10. When the desired distance from the plate member to the base is obtained, the bolt 16 is tightened and no further movement of the two walls relative to each other is possible. By the two vertical supporting walls being corrugated, all side movement is eliminated, the two walls are always held in parallel relation to each other, and the complete device is strengthened. The numeral 17 designates webbing between each of the side edges of the wall 13 and the plate member 14. The wall 13, the webbing 17, and the plate member may all be stamped from one piece of sheet metal the same as the base portions.

Figures 6, 7:
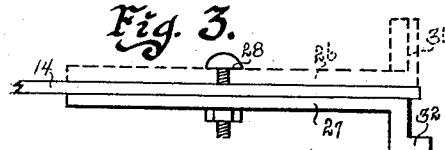
Fig. 6 is a bottom view of one of the side supporting brackets and illustrates the method of slidably mounting the same to the upper portion of the device.
Fig. 7 is an enlarged side view of the back supporting bracket designed to engage the egg beater to be held. This bracket is secured on the under side of the top portion of the device.
Figure 8:
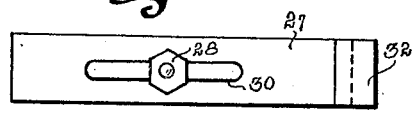
Fig. 8 is an enlarged bottom view of the supporting bracket shown in Fig. 7 and illustrates the method of slidably securing the same to the upper portion of the device.
Figure 9:
Fig. 9 is an enlarged side view of the other back supporting bracket secured on the upper side of the top portion of the device and designed to engage the egg beater to be held.
Figure 10:
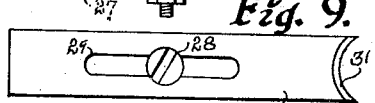
Fig. 10 is an enlarged top plan view of the bracket shown in Fig. 9 and illustrates the method of slidably securing the same to the top of the device.

I have used the numeral 18 to designate a rectangular notch in the front end of the plate member 14. It is within this notch that the handle portion of the egg beater 19 is designed to be detachably held. Diametrically opposite from each other and on each side of the notch 18 are the two side supporting brackets 20 and 21, respectively. Each of these brackets are slidably secured to the underside of the plate member and may be moved toward the center of the notch 18 by each having a bolt 22 passing through a longitudinal slot 23 in each bracket and the plate member 14. It will here be noted that formed on one end of each of the side brackets is a vertical concave engaging member 24, and on the opposite end of each of the side brackets is a vertical flat engaging member 25. By this construction if an egg beater having a round handle portion is used, the side supporting brackets will be turned so that the vertical concave engaging members will be adjacent the notch and capable of embracing the round handle portion. On the other hand if an egg beater having a flat handle portion is used, the side supporting brackets will be turned around so that the flat vertical engaging members will be adjacent the notch 14. When the egg beater is in the notch 14 each of these side supporting brackets are moved toward the center of the notch until the engaging portions thereof engage the handle of the egg beater, and the bolts 22 tightened thereby preventing the egg beater from any side swinging movement. Parallel with the notch 14 and adjacent thereto are the two back supporting brackets 26 and 27, secured on the top side and under side of the plate member respectively. These back supporting brackets are slidably secured to the plate member, by having a single bolt 28 passing through the slot 29 in the bracket 26, the plate member, and the slot 30 in the bracket 27, as shown in Fig. 7.

Figure 3:
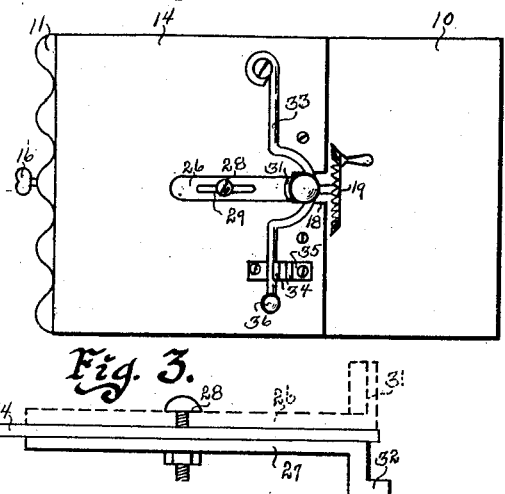
Fig. 3 is a top plan view of my device holding an egg beater and more fully illustrates its construction.
Figure 4:
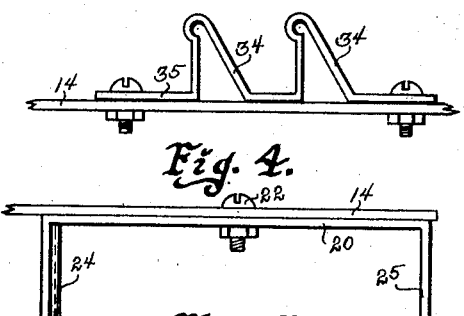
Fig. 4 is an enlarged view of the catch member secured to the top of the device designed to engage the free end of the holding arm.
Figure 5:
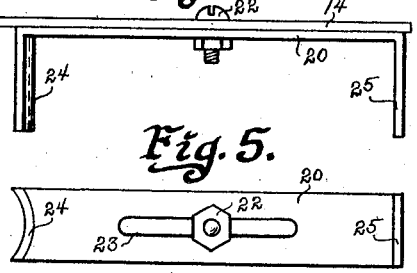
Fig. 5 is an enlarged side view of one of one of the side supporting brackets designed to engage one side of the egg beater secured to the top of the device and located on the underside of the same.

Formed on the forward end of the back supporting bracket 26 is the vertical concave engaging member 31 designed to engage the portion of the egg beater that is above the plate member. Integrally formed on the forward end of the back supporting member 27 is an engaging member 32 extending first downwardly and then forwardly as shown in Fig. 7, designed to engage the portion of the egg beater that is below the plate member. Horizontally pivoted at one end to the top of the plate member is the holding arm 33 made of spring steel or the like. This holding arm extends around the forward part of the egg beater to be held as shown in Fig. 3, and has its free end capable of engaging any one of the projections 34 of the catch member 35. To remove the egg beater from the device it is merely necessary to lift the free end of the holding arm out of engagement with the catch member 35 and swing the same outwardly so that the egg beater can be removed from the notch in the plate member.

By having a plurality of projections 34 on the catch member 35, egg beaters having various sizes of handles may be placed in the device without changing the position of the supporting brackets. If the difference in sizes and types of handles of egg beaters are too far different from each other, the back supporting brackets 26 and 27 should be adjusted to compensate for the same. It will be noted that these back supporting brackets are slidably mounted independently of each other, thereby making it possible to adjust them to the egg beater having irregularity shaped handle members.

To insert an egg beater in the device it is merely necessary to place the handle of the egg beater in the notch in the plate member and swing the holding arm around the same until it engages one of the projections 34 and the egg beater will be held against movement in any direction.

The numeral 36 designates a handle on the free end of the holding arm to facilitate the operating of the same.

Some changes may be made in the construction and arrangement of my improved holder for egg beaters, without departing from the real spirit and purpose of my invention and it is my intention to cover by my claims any modified forms of structure or use of mechanical equivalents which may be reasonably included within their scope.

I claim:

1. In a device of the class described, a supporting member, a notch in said supporting member designed to receive the handle portion of an egg beater, supporting brackets slidably mounted on said supporting member on each of said notch, an arm pivoted on one side of said notch and capable of being swung to a position across said notch, and a plurality of catch members any one of which is capable of being engaged by the free end of said arm.

2. In a device of the class described, a supporting member, a plate member secured to the top of said supporting member, a notch in said plate member designed to receive the handle portion of an egg beater, a bracket member slidably mounted on top of said plate member and adjacent said notch, a second bracket member slidably mounted on the under side of said plate member and adjacent said notch and a holding arm for preventing the removal of said egg beater from said notch.

3. In a device of the class described, a supporting member, a horizontal plate member formed on the top of said supporting member, a notch in said plate member designed to receive the handle portion of an egg beater, a bracket member above said plate member having a concave vertical engaging member integrally formed on one of its ends, a slot in said bracket member, a second bracket member below said plate member having an egg beater engaging member extending first downwardly and then forwardly on one of its ends, a slot in said last mentioned bracket, a bolt passing through said plate and said two slots and said two brackets respectively, and a means for holding said egg beater in said notch.

4. In a device of the class described, a supporting member, a notch in said supporting member designed to receive the handle portion of an egg beater, two bracket members each having a vertical concave embracing member integrally on one of their ends, and a means for rotatably and slidably mounting said brackets on each side of said notch.

5. In a device of the class described, a base member, a vertical member extending from said base member, a vertical slot in said vertical member, a second vertical member, a bolt extending through said slot and said last mentioned vertical member, a horizontal plate member secured to said last mentioned vertical member, a notch in said plate member designed to receive the handle portion of an egg beater, supporting brackets slidably mounted on said plate member, on each side of said notch and a means for securing said egg beater in said notch and between said two bracket members.

6. In a device of the class described, a base, a corrugated vertical wall extending from said base, webbing between the sides of said wall and said base, a second vertical corrugated wall, a plate member extending from the top of said last mentioned wall, webbing between said plate and the sides of said last mentioned wall, a means for securing an egg beater to said plate and a means for slidably securing said first mentioned wall to said second mentioned wall.

EDWARD V. JOHNSON.